United States Patent [19]

Damen et al.

[11] Patent Number: 4,665,612
[45] Date of Patent: May 19, 1987

[54] METHOD OF MANUFACTURING A GLASS-BONDED MAGNETIC HEAD HAVING DIFFUSION BARRIERS

[75] Inventors: Johannes P. M. Damen; Klaas Prijs; Cornelis H. M. Witmer; Gijsbertus de With, all of Eindhoven, Netherlands

[73] Assignee: U.S. Philips Corporation, New York, N.Y.

[21] Appl. No.: 849,239

[22] Filed: Apr. 7, 1986

Related U.S. Application Data

[62] Division of Ser. No. 490,287, May 2, 1983, Pat. No. 4,600,957.

[30] Foreign Application Priority Data

May 19, 1982 [NL] Netherlands .................. 8202059

[51] Int. Cl.⁴ ............................................. G11B 5/127
[52] U.S. Cl. .............................................. 29/603
[58] Field of Search .......... 29/603; 360/110, 119–121, 360/125

[56] References Cited

U.S. PATENT DOCUMENTS 3,886,025  5/1975  Riseman ............................. 29/603
4,392,167  7/1983  Joormann ........................... 360/120

*Primary Examiner*—Percy W. Echols

[57] ABSTRACT

A magnetic head (32) having a magnet core (30) of ferrite and a layer of a bonding material (28) consisting of glass in the gap-forming area of the magnet core (38). In order to ensure that on the one hand the ferrite be not attacked by the glass during the bonding process and that on the other hand the temperature adjustment during the bonding process is not too critical, double layer diffusion barriers are provided between the layer of bonding material (28) and the core parts (10) and (10'), respectively, which barriers are formed by a layer of silicon nitride (26) on the side of the bonding layer (28) and a layer of silicon oxide (24) on the side of the core parts (10) and (10'), respectively.

5 Claims, 10 Drawing Figures

METHOD OF MANUFACTURING A GLASS-BONDED MAGNETIC HEAD HAVING DIFFUSION BARRIERS

This is a division of application Ser. No. 490,287, filed May 2, 1983, now U.S. Pat. No. 4,600,957.

BACKGROUND OF THE INVENTION

The invention relates to a magnetic head which includes a magnetic core having a gap-forming area, and a layer of non-magnetizable bonding material in the gap-forming area of the magnetic core. The head also includes diffusion barriers provided between the core parts and the layer of non-magnetizable material. The invention also relates to a method of manufacturing such a magnetic head.

Magnetic heads serve to record, playback and/or erase magnetic information. They are used, for example, in tape recorders for recording and/or playing back audio information or video information. Particularly when a magnetic head is used in tape recorders for recording and/or playing back video information (so-called video recorders), it is usual to manufacture the core of the magnetic head from (monocrystalline) ferrite.

The gap of a magnetic head for a video recorder is formed by bonding two parts of (monocrystalline) ferrite to each other by means of a sputtered film of a low-meltingpoint glass. In order to prevent the glass from attacking the ferrite during bonding at approximately 700° C., the ferrite is first coated with a layer which is impervious to glass and which is often termed a diffusion barrier. Although British Patent Specification No. 1,317,634 suggests as materials for the diffusion barrier: non-magnetizable metals, metal oxides, borides, nitrides, silicon oxide and ferrite which is non-magnetizable at room temperature, a sputtered $SiO_2$ layer has so far been used in practice as the diffusion barrier. In the heating phase of the bonding process, the glass becomes less and less viscous. When the glass is heated to a sufficiently high temperature it may work as an adhesive. However, above a given temperature, the $SiO_2$-layer dissolves in the glass. As a result, the glass becomes more viscous so that its value as an adhesive decreases. In the manufacture of heads, heating to 700±5° C. has to be done quickly (in approximately 10 minutes) so as to obtain a good bonding. It has been found difficult to maintain this narrow tolerance of ±5° C.

So the search is for a diffusion barrier which permits a freer temperature adjustment. It was expected that silicon nitride, which is known from I.C. technology to be impervious to glass in certain circumstances, might be suitable. A glass-bonded ferrite head with a silicon nitride barrier has been suggested in German Offenlegungsschrift No. 2,341,649.

It has been found, however, that thin $Si_3N_4$ layers having ferrite as a substratum are damaged after termination of the temperature cycle of the bonding process. The glass penetrates through the chinks formed, flows below the $Si_3N_4$ and attacks the ferrite.

The damage to the $Si_3N_4$ layer is probably the result of the high elastic stress at the interface $Si_3N_4$-ferrite. This stress may substantially be ascribed to the comparatively low elasticity of $Si_3N_4$.

SUMMARY OF THE INVENTION

It is the object of the present invention to provide a magnetic head of the kind described in the opening paragraph having a diffusion barrier in the gap-forming area which associates a comparatively free temperature adjustment during the bonding process with a sufficient insensitivity to the temperature occurring during the bonding process.

For that purpose, the magnetic head according to the invention is characterized in that each diffusion barrier includes a layer of silicon nitride adjoining the non-magnetizable bonding layer, and a layer of silicon oxide.

Interestingly, it was found that, in a ferrite head having in the gap-forming area a system of layers $SiO_2$-$Si_3N_4$-glass-$Si_3N_4$-$SiO_2$, the system of layers remained totally undamaged after heating to 700° C. and cooling to room temperature. Thus, the glass was not capable of reacting with the ferrite and the $SiO_2$ was not capable of dissolving in the glass. Consequently, said system of layers satisifes the requirements imposed.

Because of the good action as a diffusion barrier of the silicon oxide-silicon nitride double layer, the temperature control upon bonding the core parts in the gap-forming area is less critical while, nevertheless, an accurately defined proportioning of the non-magnetic gap area is obtained. Therefore, the present invention significantly improves the efficiency of manufacturing glass-cemented ferrite heads.

The invention also relates to a method of manufacturing a magnetic head having the above-mentioned structure. The method comprises the following steps: forming a first core part and a second core part of magnetic material; working a face of each of said core parts in such manner that said faces may serve as gap-forming faces; providing a layer of anti-diffusion material on each of the gap-forming faces; providing a layer of bonding material on at least one of the layers of anti-diffusion material; placing the two core parts against each other with the provided layers in between; and forming a permanent bond by means of a thermal treatment, and is characterized in that the layer of anti-diffusion material is provided by sputtering, from a first target, a layer of $SiO_2$ having a desired thickness and by subsequently sputtering a layer of $Si_3N_4$ having a desired thickness. The layer of $Si_3N_4$ may be sputtered from an $Si_3N_4$ target or, which is easier, may be sputtered in a nitrogen-containing gas atmosphere from a silicon target. In the latter case, the silicon target may be also be used to sputter the layer of $SiO_2$. For that purpose, sputtering should be carried out in an oxygen-containing atmosphere. By gradually replacing the oxygen of the gas atmosphere during sputtering by nitrogen after a layer of $SiO_2$ having a desired thickness has been provided, it is achieved that the silicon oxide layer turns gradually into the silicon nitride layer.

BRIEF DESCRIPTION OF THE DRAWING

An embodiment of the invention will be described in greater detail with reference to the accompanying drawing, in which.

DESCRIPTION OF THE PREFERRED EMBODIMENTS

Figure 1:
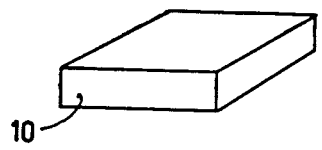
FIG. 1 is a perspective view which shows a block of starting material.
Figure 2:
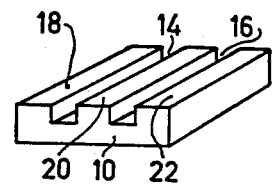
FIG. 2 is a perspective view which shows a worked core part.

A block of material 10 which may be manufactured from polycrystalline (sintered) or, in particular, monocrystalline ferrite (FIG. 1) is given the shape shown in FIG. 2 by means of the usual techniques. As is shown in FIG. 2, two grooves 14, 16 are provided in the block 10 and the surfaces 18, 20 and 22 are polished so that they may serve as gap-bounding faces.

Figure 3A:
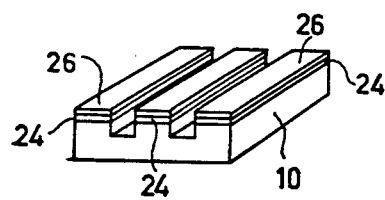
FIGS. 3a and 3b are perspective views which show two core parts provided with layers for forming a diffusion barrier.
Figure 3B:
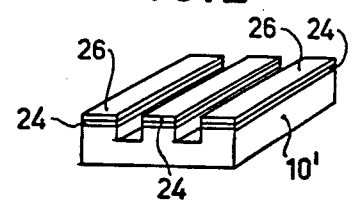

By using known deposition methods, first layers 24 are provided on the surfaces 18, 20, 22 of core parts 10, 10' (FIGS. 3a, 3b). The first layers 24 consist of a non-magnetizable material which does not react, or at most reacts very slightly, with ferrite. For example, the non-magnetizable material may be silicon oxide. Silicon oxide (e.g. $SiO_2$) can easily be provided by means of a sputtering method and because of its comparatively high elasticity, after providing shows a comparatively low elastic stress at the interface with the ferrite.

An alternative method of providing a thin layer of $SiO_2$ is the so-called reactive vapor deposition method. In this method, a mixture of $SiH_2$ and $O_2$ is applied to a furnace which is kept at a temperature of approximately 400° C. and in which the pole pieces are present. It has been found that a homogeneous layer of $SiO_2$ is then formed on the core parts.

Second layers 26 are provided on the first layers 24. Said second layers 26 consist of $Si_3N_4$. A thickness of between 100 and 1000 Å is preferable for each of the layers 24, 26. 200 Å is a particularly preferable thickness. In order to achieve a gradual change of the chemical composition of the $SiO_2$ layer into a $Si_3N_4$ layer, the $SiO_2$ may be sputtered from an Si-target (in oxygen) instead of from an $SiO_2$-target and the atmosphere during sputtering may then be replaced gradually by nitrogen as a result of which the last sputtered material becomes $Si_3N_4$.

Figure 4A:
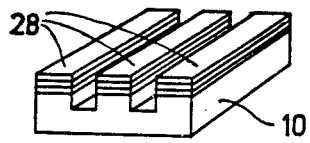
FIGS. 4a and 4b are perspective views which show the core parts of FIGS. 3a and 3b after providing bonding layers.
Figure 4B:
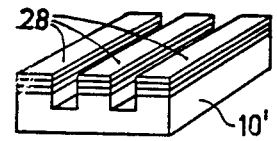

Bonding layers 28 are provided on the second layers 26 which, together with the layers 24, form a diffusion barrier (FIGS. 4a, 4b). The third layers 28 may consist of a glass which comprises 12–20% by weight of $Al_2O_3$, 40–48% by weight of $B_2O_3$, and furthermore a share of one or more of the oxides BaO, CaO or SrO. A suitable glass comprises, for example, 15 mol % $Al_2O_3$, 60 mol % $B_2O_3$ and 25 mol % BaO or SrO. This glass can be provided by means of sputtering with the composition remaining constant and can be provided in the same sputtering device as the layers 24, 26 from a glass target.

The sum of the thicknesses of the layers 24, 26 and 28 determines the ultimate gap length of the magnetic head.

Figure 5:
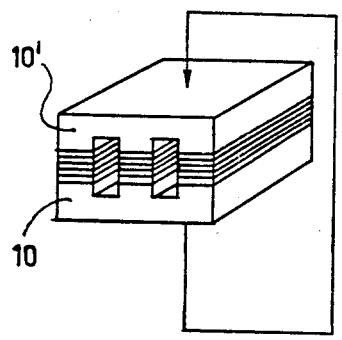
FIG. 5 is a perspective view which shows an assembly of the two core parts bonded together under pressure.
Figure 6:
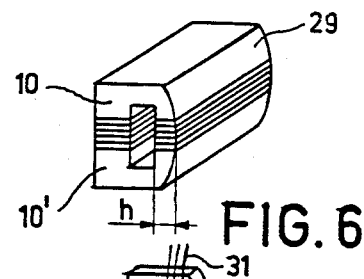
FIG. 6 is a perspective view which shows the assembly of FIG. 5 after a tape contact face has been provided.
Figure 7A:
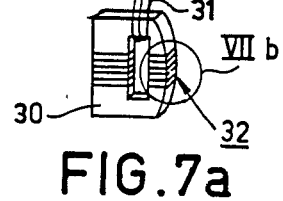
FIGS. 7a and 7b show an ultimate magnetic head and an enlarged view of the gap-forming area, respectively.

The core parts 10, 10' are then placed against each other with the glass layers (FIG. 5) and heated in a furnace at a temperature which is sufficiently high to soften the layer of glass (for example, approximately 650° C.), the core parts 10, 10' being pressed against each other at a pressure of 20–70 kg/cm². After cooling, the core parts 10, 10' are rigidly connected together and may then be further processed to obtain a magnetic head of the desired shape. For example, the assembly may be processed and polished so that, with simultaneous adjustment of the gap height h, the construction shown in FIG. 6 is formed which has a tape contact face 29. As shown in FIG. 7a, this construction may again be divided into individual magnet core segments 30 which, after providing an electric winding 31, form a magnetic head 32.

Figure 7B:
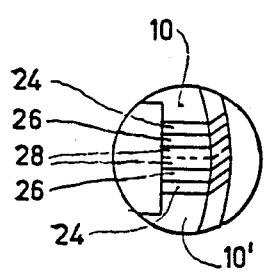

FIG. 7b shows, with reference to an enlargement of the gap-forming area of the magnetic head 32 of FIG. 7a, the resulting layer structure of the gap-forming area between the (ferrite) core parts 10, 10'. A layer 24 of silicon oxide and a layer 26 of silicon nitride are provided on each of the core parts 10, 10'. The assembly is cemented together via a glass layer 28.

What is claimed is:

1. A method of manufacturing a magnetic head comprising forming a first core part and a second core part of magnetic material; working a face of each of said core parts in such manner that said faces may serve as gap-forming faces; providing a layer of anti-diffusion material on each of the gap-forming faces; providing a layer of bonding material on at least one of the layers of anti-diffusion material; placing the two core parts against each other with the provided layers in between; and forming between the layers of anti-diffusion material a permanent bond by means of a thermal treatment, characterized in that the layer of anti-diffusion material is provided by sputtering, from a first target, a layer of $SiO_2$ having a desired thickness and then sputtering a layer of $Si_3N_4$ having a desired thickness.

2. A method as claimed in claim 1, characterized in that the layer of $SiO_2$ is sputtered, from an $SiO_2$ target.

3. A method as claimed in claim 1, characterized in that the layer of $Si_3N_4$ is sputtered from an $Si_3N_4$ target.

4. A method as claimed in claim 1, characterized in that the layer of $Si_3N_4$ is sputtered in a nitrogen-containing gas atmosphere from an Si target.

5. A method as claimed in claim 1, characterized in that the layer of $SiO_2$ is sputtered from an Si target in an oxygen-containing gas atmosphere and that, after providing the layer of $SiO_2$ having the desired thickness, the oxygen of the gas atmosphere is replaced gradually during the sputtering by nitrogen and sputtering in the nitrogen-containing gas atmosphere is continued until the layer of $Si_3N_4$ of the desired thickness has been formed.

* * * * *